(12) United States Patent
Kondo et al.

(10) Patent No.: US 7,356,189 B2
(45) Date of Patent: Apr. 8, 2008

(54) MOVING IMAGE COMPRESSION DEVICE AND IMAGING DEVICE USING THE SAME

(75) Inventors: Yoshimasa Kondo, Matsumoto (JP); Tsunenori Kimura, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 765 days.

(21) Appl. No.: 10/847,612

(22) Filed: May 18, 2004

(65) Prior Publication Data

US 2005/0157937 A1    Jul. 21, 2005

(30) Foreign Application Priority Data

May 28, 2003  (JP)  ............................. 2003-150849

(51) Int. Cl.
  *G06K 9/36*  (2006.01)
  *G06K 9/46*  (2006.01)
(52) U.S. Cl. .................. 382/232; 382/250; 348/384.1; 358/426.01
(58) Field of Classification Search ........ 382/232–253; 348/384.1–440.1; 358/426.01–426.16
See application file for complete search history.

(56) References Cited

U.S. PATENT DOCUMENTS

| | | | | |
|---|---|---|---|---|
| 5,990,958 | A * | 11/1999 | Bheda et al. ............. | 348/407.1 |
| 7,151,800 | B1 * | 12/2006 | Luna et al. ............. | 375/240.23 |
| 2002/0136292 | A1 * | 9/2002 | Li ......................... | 375/240.01 |
| 2002/0168066 | A1 * | 11/2002 | Li .............................. | 380/200 |
| 2003/0016878 | A1 * | 1/2003 | Motosu et al. .............. | 382/251 |
| 2003/0118102 | A1 * | 6/2003 | Li et al. ................. | 375/240.12 |
| 2003/0118113 | A1 * | 6/2003 | Comer et al. .......... | 375/240.25 |
| 2003/0231710 | A1 * | 12/2003 | Bolton .................... | 375/240.2 |
| 2004/0193289 | A1 * | 9/2004 | Chen et al. .................... | 700/3 |
| 2005/0031216 | A1 * | 2/2005 | Kondo et al. ................ | 382/233 |
| 2005/0123037 | A1 * | 6/2005 | Kondo et al. .......... | 375/240.03 |
| 2005/0123048 | A1 * | 6/2005 | Kondo et al. .......... | 375/240.16 |
| 2005/0123049 | A1 * | 6/2005 | Kondo et al. .......... | 375/240.16 |
| 2005/0123050 | A1 * | 6/2005 | Kondo et al. .......... | 375/240.16 |
| 2005/0157937 | A1 * | 7/2005 | Kondo et al. ............... | 382/236 |
| 2005/0249280 | A1 * | 11/2005 | Kondo et al. .......... | 375/240.03 |
| 2005/0254579 | A1 * | 11/2005 | Kondo .................. | 375/240.03 |

(Continued)

FOREIGN PATENT DOCUMENTS

JP      06-164413 A    6/1994

(Continued)

OTHER PUBLICATIONS

U.S. Appl. No. 10/847,613, filed May 18, 2004, Yoshimasa Kondo et al.

(Continued)

*Primary Examiner*—Aaron W Carter
(74) *Attorney, Agent, or Firm*—Oliff & Berridge, PLC

(57) ABSTRACT

A moving image compression (or encoding) device including: a hardware processing section which compresses moving image data by hardware; a data storage section which stores the moving image data processed by the hardware processing section; and a software processing section which compresses the moving image data from the data storage section by software. The hardware processing section includes a plurality of processing sections which perform processing including a discrete cosine transform and quantization of the moving image data. The software processing section performs variable-length coding of the quantized moving image data.

13 Claims, 12 Drawing Sheets

U.S. PATENT DOCUMENTS

2006/0143337 A1* 6/2006 Kondo et al. .................. 710/58
2006/0143615 A1* 6/2006 Kondo et al. ............... 718/100
2007/0052842 A1* 3/2007 Luna et al. .............. 348/395.1

FOREIGN PATENT DOCUMENTS

| | | |
|---|---|---|
| JP | 07-222163 A | 8/1995 |
| JP | 08-205175 A | 8/1996 |
| JP | 09-084004 A | 3/1997 |
| JP | 09-247673 A | 9/1997 |
| JP | 10-098731 A | 4/1998 |
| JP | 11-136677 A | 5/1999 |
| JP | 2002-159006 A | 5/2002 |

OTHER PUBLICATIONS

U.S. Appl. No. 10/851,334, filed May 24, 2004 Yoshimasa Kondo et al.

Xun Mao et al.; "Software/Hardware Based Multimedia Video Terminal Embedded in PC"; *Journal of Image and Graphics*; vol. 6(A), No. 6; Jun. 2001; pp. 599-603. (with abstract and translation).

* cited by examiner

FIG. 4

DCT COEFFICIENT

FREQUENCY IS HIGHER →

FREQUENCY IS HIGHER ↓

| 224 | 130 | 40 | 16 | 11 | 8 | -2 | -1 |
|---|---|---|---|---|---|---|---|
| 41 | -34 | -14 | -10 | -4 | 0 | -1 | 3 |
| -7 | 10 | -12 | 2 | 2 | -5 | 1 | -1 |
| 22 | -7 | 9 | 2 | 0 | 0 | -3 | 2 |
| -8 | 4 | -6 | 3 | -1 | -2 | 4 | -1 |
| 5 | 2 | -1 | -4 | 0 | 1 | -1 | -1 |
| 4 | -5 | 3 | -1 | 0 | 2 | 0 | -1 |
| -5 | 5 | -2 | 3 | 0 | -2 | 1 | -1 |

FIG. 5

QUANTIZATION TABLE

| 8 | 6 | 5 | 8 | 12 | 20 | 26 | 30 |
|---|---|---|---|---|---|---|---|
| 6 | 6 | 7 | 10 | 13 | 29 | 30 | 28 |
| 7 | 7 | 8 | 12 | 20 | 29 | 35 | 28 |
| 7 | 9 | 11 | 15 | 26 | 44 | 40 | 31 |
| 9 | 11 | 19 | 28 | 34 | 55 | 52 | 39 |
| 12 | 18 | 28 | 32 | 41 | 52 | 57 | 46 |
| 25 | 32 | 39 | 44 | 52 | 61 | 60 | 51 |
| 36 | 46 | 48 | 49 | 56 | 50 | 52 | 50 |

FIG. 6

QUANTIZED DCT COEFFICIENTS (QF DATA)

| 28 | 22 | 8 | 2 | 1 | 0 | 0 | 0 |
|---|---|---|---|---|---|---|---|
| 7 | -6 | -2 | -1 | 0 | 0 | 0 | 0 |
| -1 | 1 | -2 | 0 | 0 | 0 | 0 | 0 |
| 3 | -1 | 1 | 0 | 0 | 0 | 0 | 0 |
| -1 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |

ZERO COUNT DATA PACKET

7-BIT COMPRESSED DATA PACKET

UNCOMPRESSED DATA PACKET

FIG. 11

QF DATA IN ONE BLOCK (HEXADECIMAL)

| 025 | 001 | 000 | 000 | 000 | 000 | 000 | 000 |
|-----|-----|-----|-----|-----|-----|-----|-----|
| 02F | 003 | 000 | FFC | FFF | 000 | 000 | 000 |
| 04B | FFB | FFF | 000 | 001 | 000 | 000 | 000 |
| 04F | FF7 | FFA | FFD | FFF | 000 | 000 | 000 |
| 032 | FF9 | 000 | FFE | 000 | 000 | FFC | 000 |
| 026 | 002 | 001 | FFE | FFF | 000 | 000 | 000 |
| 029 | FFB | 000 | 000 | 000 | 000 | 000 | 000 |
| 000 | 000 | 000 | 000 | 000 | 000 | 000 | 000 |

⇩

|0|0|0|0|0|0|1|0|0|1|0|0|1|0|1| ← 7-BIT COMPRESSED DATA PACKET
    ‖            ‖
   001         025

|1|0|0|1|0|0|0|0|0|0|0|0|1|1|0| ← ZERO COUNT DATA PACKET
        ‖
SIX ZERO DATA ITEMS ARE
CONTINUOUSLY ARRANGED

|0|0|0|0|0|0|1|1|0|0|1|0|1|1|1|1| ← 7-BIT COMPRESSED DATA PACKET
    ‖            ‖
   003         02F

|1|0|0|1|0|0|0|0|0|0|0|0|0|0|1| ← ZERO COUNT DATA PACKET
        ‖
THERE IS ONE ZERO DATA ITEM

|1|0|0|0|0|1|1|1|1|1|1|1|1|0|0| ← UNCOMPRESSED DATA PACKET
        ‖
       FFC

|1|0|0|0|0|1|1|1|1|1|1|1|1|1|1| ← UNCOMPRESSED DATA PACKET
        ‖
       FFF

|1|0|0|1|0|0|0|0|0|0|0|0|0|1|1| ← ZERO COUNT DATA PACKET
        ‖
THREE ZERO DATA ITEMS ARE
CONTINUOUSLY ARRANGED

MOVING IMAGE COMPRESSION DEVICE AND IMAGING DEVICE USING THE SAME

Japanese Patent Application No. 2003-150849, filed on May 28, 2003, is hereby incorporated by reference in its entirety.

BACKGROUND OF THE INVENTION

The present invention relates to a compression device which compresses a moving image using a Moving Picture Experts Group (MPEG) method or the like, and an imaging device using the same.

In a conventional MPEG-4 compression (or encoding)/decompression (or decoding) device, the entire encoding/decoding is performed by hardware.

In the case where the entire encoding/decoding is performed by hardware, the circuit scale is necessarily increased, whereby reduction of the IC size is hindered. If such a device is applied to a portable instrument such as a portable telephone, a demand for reduction of the size of the instrument cannot be satisfied.

In the case where the entire encoding/decoding is performed by software, the load imposed on the CPU increases. Therefore, since the time necessary for the CPU to perform other processing is limited, the performance of the instrument cannot be realized. Moreover, since the operation time of the CPU increases, power consumption is increased. If such a device is applied to a portable instrument such as a portable telephone, a demand for reduction of power consumption in order to maintain battery life cannot be satisfied.

BRIEF SUMMARY OF THE INVENTION

Accordingly, the present invention may provide a moving image compression device in which moving image compression processing is divided between hardware and software according to the properties of the hardware and the software, and an imaging device using such a moving image compression device.

The present invention may also provide a moving image compression device in which moving image compression processing is performed by hardware and software in parallel and in which the buffer capacity necessary for the processing is reduced, and an imaging device using such a moving image compression device.

According to one aspect of the present invention, there is provided a moving image compression device, comprising:

a hardware processing section which compresses moving image data by hardware;

a data storage section which stores the moving image data processed by the hardware processing section; and a software processing section which compresses the moving image data from the data storage section by software, wherein the hardware processing section includes a plurality of processing sections which perform processing including a discrete cosine transform and subsequent quantization of the moving image data; and wherein the software processing section performs variable-length coding of the moving image data quantized by the hardware processing section.

Most of the moving image data quantized after the discrete cosine transform is zero data, and so the number of types of information and amount of information are significantly small in comparison with the data before quantization. Moreover, the operation load for the variable-length coding is small. Therefore, the processing load to the software processing section is small because the amount of information is small and the operation load is reduced. On the contrary, the processing load of quantization and most processing before the quantization is large when the processing is performed by software because the amount of information is great and the operation is complicated. Although the above processing is heavy load processing, the necessity of changing the processing is limited since the format of the processing is determined in advance. Moreover, since most of the processing is repetition processing, it is suitable for hardware processing. Furthermore, since the amount of data after the processing by hardware is small, the amount of data transmitted from the hardware processing section to the software processing section is small, whereby the transmission load is reduced. Since the data storage section which functions as a buffer is provided between the software processing section and the hardware processing section, the software processing and the hardware processing can be performed in parallel. In addition, size reduction of the device and reduction of power consumption can be achieved by using properly both the software processing and the hardware processing.

The hardware processing section may include a data compression section which compresses the moving image data to be stored in the data storage section. The software processing section may include a data decompression section which decompresses the moving image data from the data storage section. This enables the capacity of the data storage section to be reduced, whereby the size of the device can be reduced.

The data compression section may count the number of zero data items continuously arranged on at least one pixel line and compresses the zero data items into a zero data count value. Since most alternating current components of high frequency of the moving image data after quantization are zero data, the moving image data can be efficiently compressed.

The data storage section may include a plurality of types of packets each of which has a predetermined number of bits, the packets being identified by a higher-order bit. The data compression section may selectively use the packets depending on whether the packets store compressed data or uncompressed data.

One of the packets may be a zero count data packet. The data compression section may store the zero data count value in this zero count data packet.

Another one of the packets may be a compressed data packet. The data compression section may store a plurality of items of the moving image data in the same compression data packet, each of the items of the moving image data being represented by one or more bits, and the number of bits of the moving image data being equal to or less than a predetermined number.

Still another one of the packets may be an uncompressed data packet. The data compression section may store the moving image data in the uncompressed data packet, the moving image data being represented by one ore more bits, and the number of bits of the moving data being larger than a predetermined number. Since the moving image data after quantization stored in the uncompressed data packet is comparatively small, the degree of compression rarely decreases.

The data storage section may include a first storage region which stores the moving image data for at least one frame. The hardware processing section may include a processing section which performs the discrete cosine transform of the moving image data in units of blocks, each block including 8×8 pixels. The first storage region may include a second storage region for one block of the moving image data, and the second storage region may have all the types of the packets.

A control data packet which stores control data generated by the hardware processing section may be provided in the second storage region. The control data is used for the compression processing by the software processing section.

The hardware processing section may include a decompression processing section which performs inverse transform and decompresses quantized data. In this case, the data storage section may include a decompressed data storage region which stores the moving image data for at least one frame decompressed by the hardware processing section.

The software processing section may perform scan processing before the variable-length coding. The software processing section may perform alternating current/direct current (AC/DC) component prediction before the scan processing.

According to another aspect of the present invention, there is provided an imaging device, comprising:

an imaging section;

a first integrated circuit which compresses moving image data from the imaging section by hardware;

a host CPU connected to the first integrated circuit; and a second integrated circuit connected to the host CPU and including a software processing section, wherein the first integrated circuit includes a hardware processing section which compresses the moving image data from the imaging section by hardware, and a data storage section which stores the moving image data processed by the hardware processing section;

the hardware processing section includes a plurality of processing sections which perform processing including a discrete cosine transform and subsequent quantization of the moving image data; and the software processing section performs variable-length coding of the moving image data quantized by the hardware processing section.

In addition to the effects of the above-described moving image compression device, the time in which the host CPU is exclusively used for data transmission can be reduced by providing the moving image compression device in the imaging device, since amount of information transmitted between the first and second integrated circuits by the host CPU is small.

BRIEF DESCRIPTION OF THE SEVERAL VIEWS OF THE DRAWING

FIG. 4 is a table showing an example of DCT coefficients obtained by a discrete cosine transform (DCT).

FIG. 5 is an example of a quantization table used in quantization.

FIG. 6 is a table showing quantized DCT coefficients (or QF data) obtained by dividing the DCT coefficients in FIG. 4 by numerical values in the quantization table of FIG. 5.

FIG. 11 shows operation to store QF data of one block in various data packets.

DETAILED DESCRIPTION OF THE EMBODIMENT

An embodiment of the present invention is described below with reference to the drawings.

Portable Telephone

Figure 1:
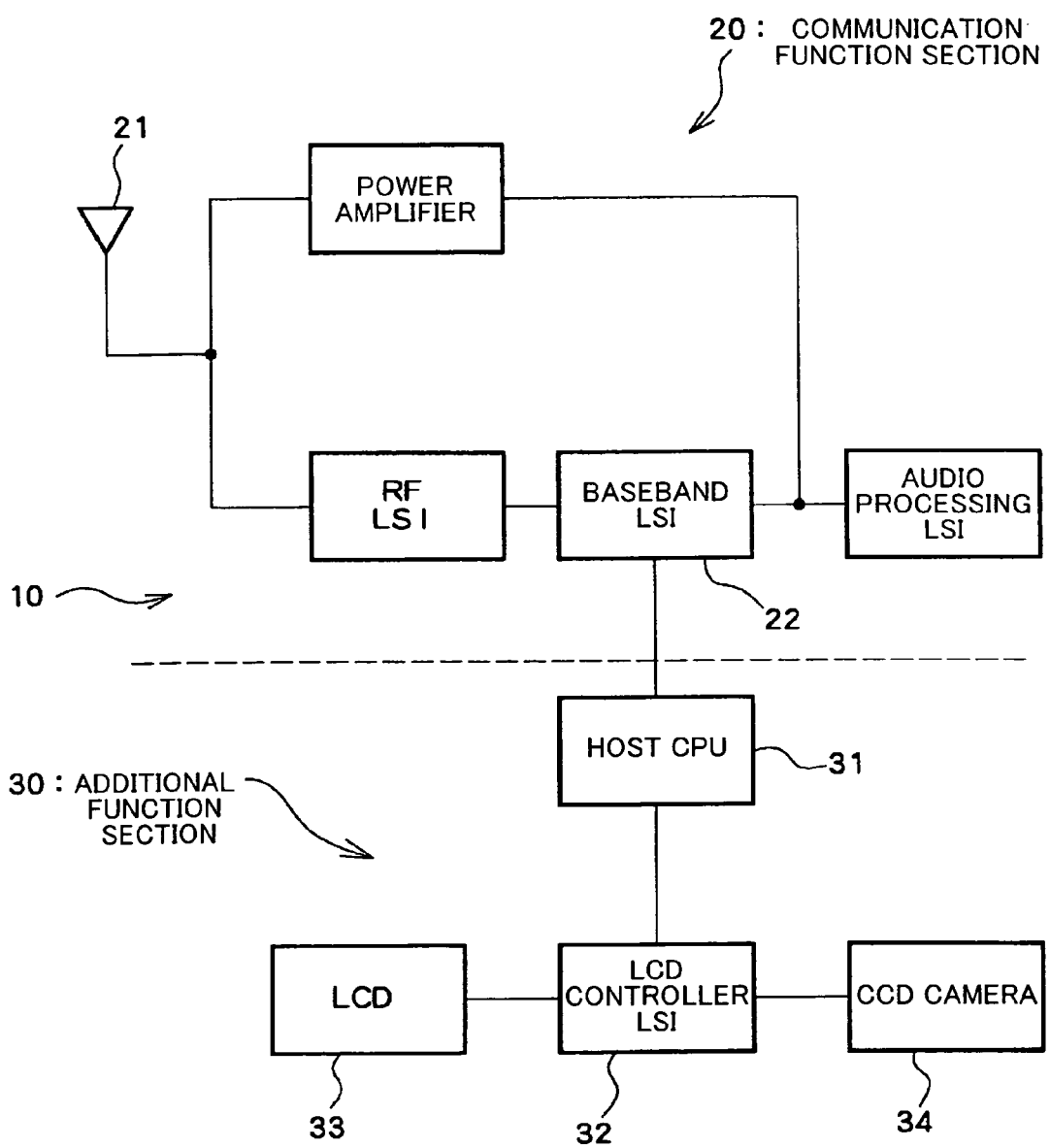
FIG. 1 is a schematic block diagram showing a portable telephone which is an example of an electronic instrument to which the present invention is applied.
Figure 2A:
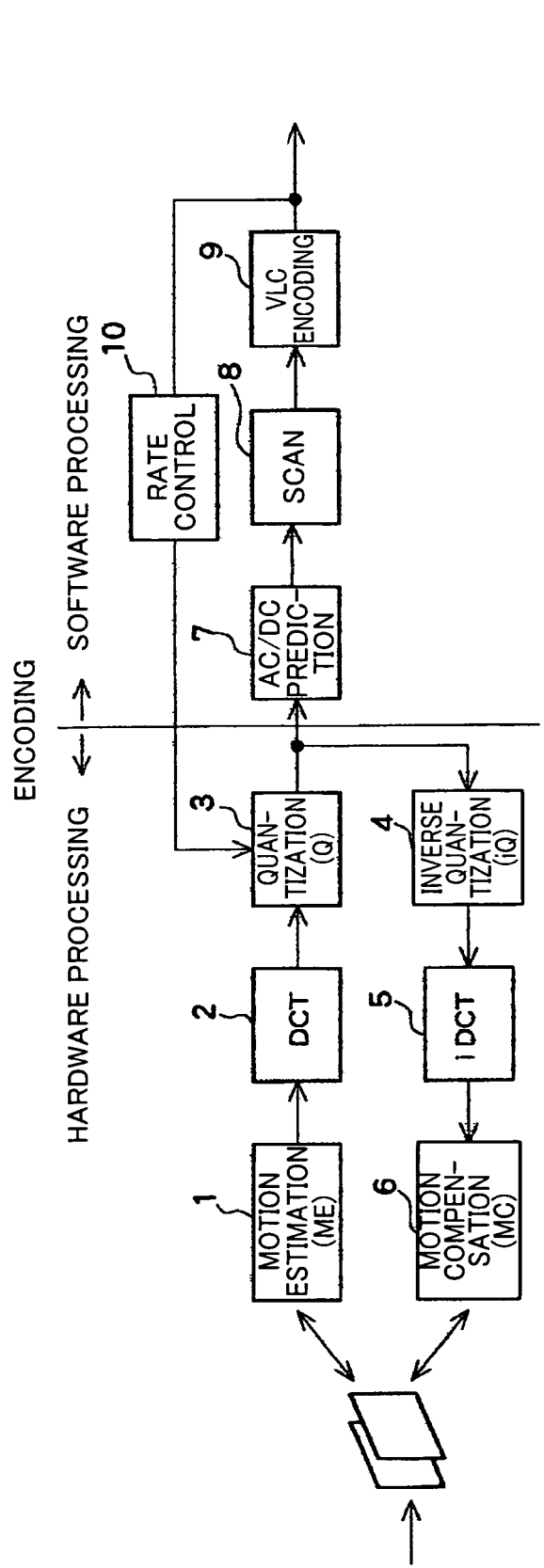
FIG. 2A is a flowchart showing the processing by an MPEG encoder.
Figure 2B:
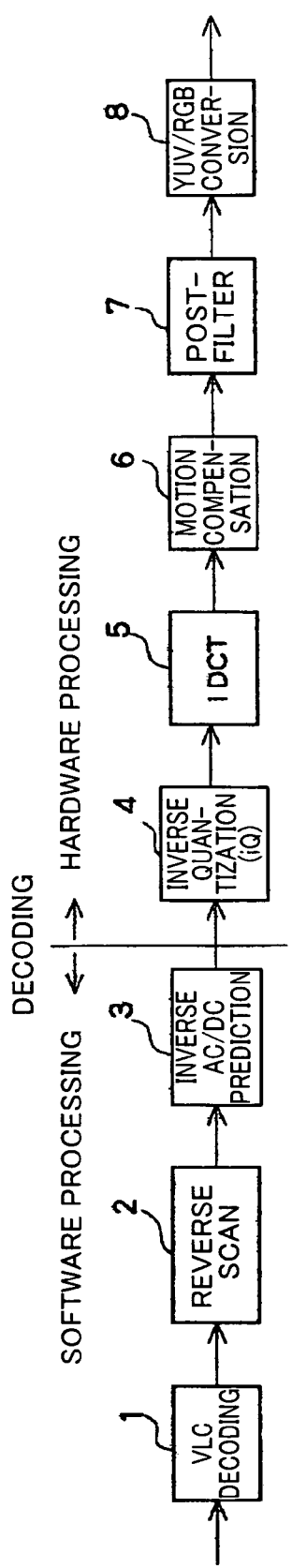
FIG. 2B is a flowchart showing the processing by an MPEG decoder.

FIG. 1 is a block diagram of a portable telephone which is an example of an electronic instrument to which the present invention is applied. In FIG. 1, a portable telephone 10 is roughly divided into a communication function section 20 and an additional function section 30. The communication function section 20 includes various conventional blocks which process a signal (including a compressed moving image) transmitted and received through an antenna 21. A baseband LSI 22 (second integrated circuit) in the communication function section 20 is a processor which mainly processes voice or the like, and is necessarily provided in the portable telephone 10. The baseband LSI 22 is provided with a baseband engine (BBE), an application processor, and the like. encoding, scanning, AC/DC (alternating current/direct current component) prediction, and rate control of MPEG-4 compression (or encoding) shown in FIG. 2A are performed by software on the processor. VLC decoding, inverse scanning, and inverse AC/DC (alternating current/direct current component) prediction of MPEG-4 decoding shown in FIG. 2B are performed by software on the processor provided in the baseband LSI 22. The remaining MPEG-4 decoding and encoding is performed by hardware provided in the additional function section 30.

The additional function section 30 includes a host central processing unit (CPU) 31 connected with the baseband LSI 22 in the communication function section 20. An LCD controller LSI 32 (first integrated circuit) is connected with the host CPU 31. A liquid crystal display device (LCD) 33 as an image display section and a CCD camera 34 as an imaging section are connected with the LCD controller LSI 32. The hardware processing of MPEG-4 decoding and encoding is performed by hardware provided in the LCD controller LSI 32.

MPEG-4 Encoding and Decoding

The MPEG-4 encoding and decoding shown in FIGS. 2A and 2B is briefly described below. The details of the processing are described in "JPEG & MPEG: Illustrated Image Compression Technology", Hiroshi Ochi and Hideo Kuroda, Nippon Jitsugyo Publishing Co., Ltd., for example. In the following description, only the processing relating to the present invention is mainly described.

In the encoding shown in FIG. between two successive images is performed (Step 1). In more detail, the difference between the two images is calculated for a single pixel. Since the difference between the two images is zero in the still image region, the amount of information can be reduced. The zero data in the still image region and the difference (positive and negative component) in the moving image region make up information after the motion estimation.

Figure 3:
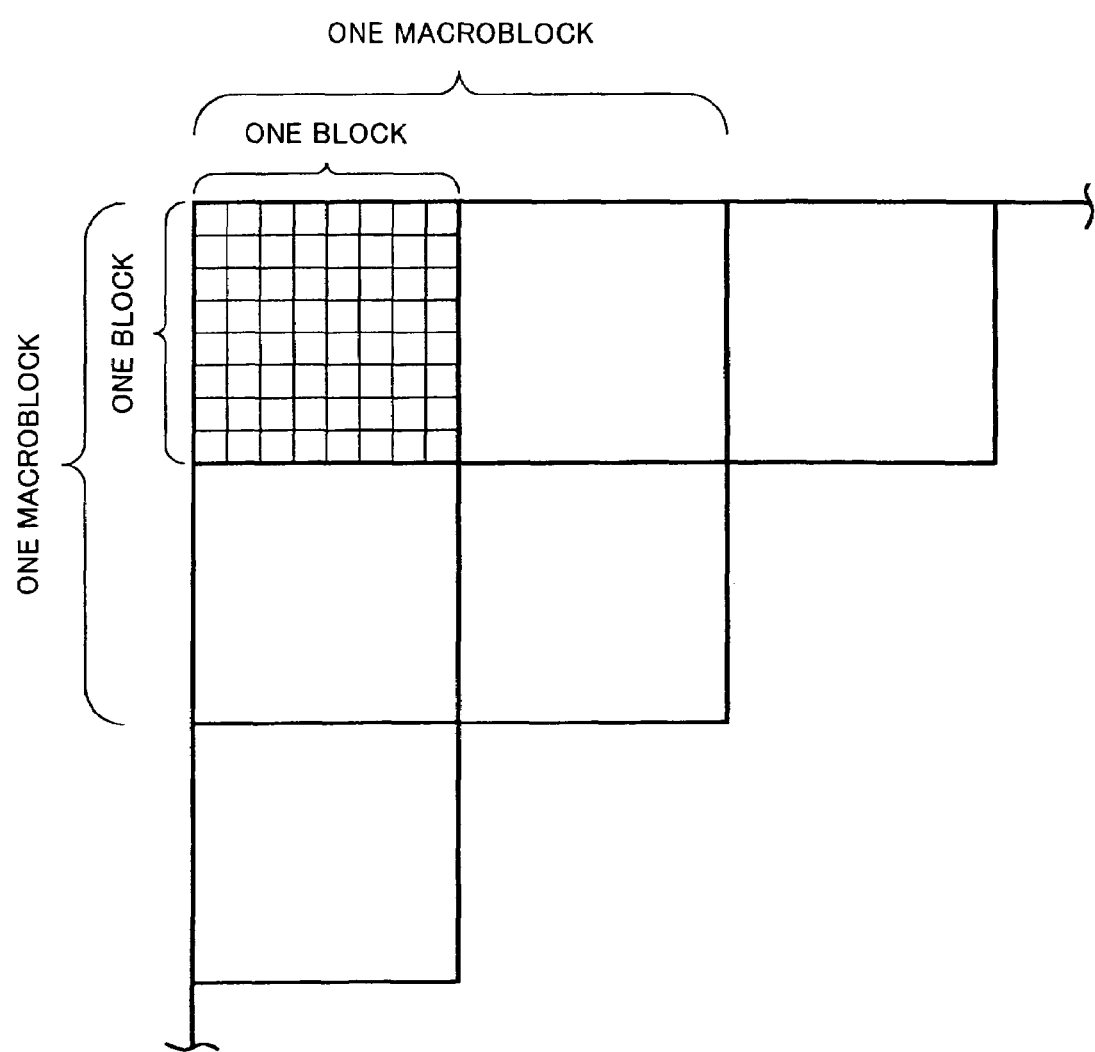
FIG. 3 is a diagram for illustrating a block and a macroblock as a processing unit in an MPEG encoder and an MPEG decoder.

A discrete cosine transform (DCT) is then performed (Step 2). The discrete cosine transform is performed in units of 8×8 pixel blocks shown in FIG. 3, and DCT coefficients are calculated in units of blocks. The DCT coefficients after the discrete cosine transform represent changes in light and shade of an image in one block by average brightness (DC component) and spatial frequency (AC component). FIG. 4 shows an example of the DCT coefficients in one 8×8 pixel block (quotation from FIG. 5-6 on page 116 in the above reference document). The DCT coefficient on the upper left corner represents a DC component, and the remaining DCT coefficients represent AC components. The influence on image recognition is small even if high-frequency AC components are omitted.

The DCT coefficients are then quantized (Step 3). The quantization is performed in order to reduce the amount of information by dividing the DCT coefficients in one block by quantization step values at corresponding positions in a quantization table. FIG. 6 shows the DCT coefficients in one block obtained by quantizing the DCT coefficients shown in FIG. 4 using a quantization table shown in FIG. 5 (quotation from FIGS. 5-9 and 5-10 on page 117 in the above reference document). As shown in FIG. 6, most of the DCT coefficients of high frequency components become zero data after dividing the DCT coefficients by the quantization step values and rounding off to the nearest whole number, whereby the amount of information is significantly reduced.

A feed-back route is necessary for the encoding in order to perform the above-described motion estimation between the currently processed frame and the subsequent frame. As shown in FIG. 2A, inverse quantization (iQ), inverse DCT, and motion compensation (MC) are performed through the feed-back route (Steps 4 to 6). The detailed operation of motion compensation is omitted. This processing is performed in units of 16×16 pixel macroblocks shown in FIG. 3.

The series of processing in Steps 1 to 6 is performed by the hardware provided in the LCD controller LSI 32 of the present embodiment.

AC/DC prediction, scanning, variable-length coding, and rate control performed by the software on the processor provided in the baseband LSI 22 shown in FIG. 1 are described below.

AC/DC prediction performed in Step 7 and scanning-performed in Step 8 shown in FIG. 2A are processing necessary for Variable length coding in Step 9. The reason therefor is as follows. In the Variable length coding in Step 9, the difference in the DC component between adjacent blocks must be encoded, and the order of encoding must be determined for the AC components by scanning the AC components in the block from the low frequency side to the high frequency side (also called a "zigzag scan").

Variable length coding in Step 9 is also called entropy encoding, and has an encoding principle in which a component with higher emergence frequency is represented by using a smaller code. The difference in the DC component between adjacent blocks is encoded, and the DCT coefficients of the AC components are sequentially encoded from the low frequency side to the high frequency side in the order of scanning by utilizing the results obtained in Steps 7 and 8.

The amount of information generated by image signals changes depending on the complexity of the image and intensity of motion. In order to absorb the change and transmit the information at a constant transmission rate, it is necessary to control the number of codes to be generated. This is achieved by rate control in Step 10. A buffer memory is generally provided for rate control. The amount of information to be stored is monitored so that the buffer memory does not overflow, and the amount of information to be generated is reduced before the buffer memory overflows. In more detail, the number of bits which represent the DCT coefficient is reduced by roughening the quantization characteristics in Step 3.

FIG. 2B shows decoding of the compressed moving image. The decoding is achieved by inversely performing the encoding shown in FIG. 2A in the reverse order. A "postfilter" shown in FIG. 2B is a filter for eliminating block noise. In the decoding, VLC decoding (step 1), inverse scanning (step 2), and inverse AC/DC prediction (step 3) are processed by the software, and processing after inverse quantization (steps 4 to 8) is processed by the hardware.

LCD Controller LSI

Figure 7:
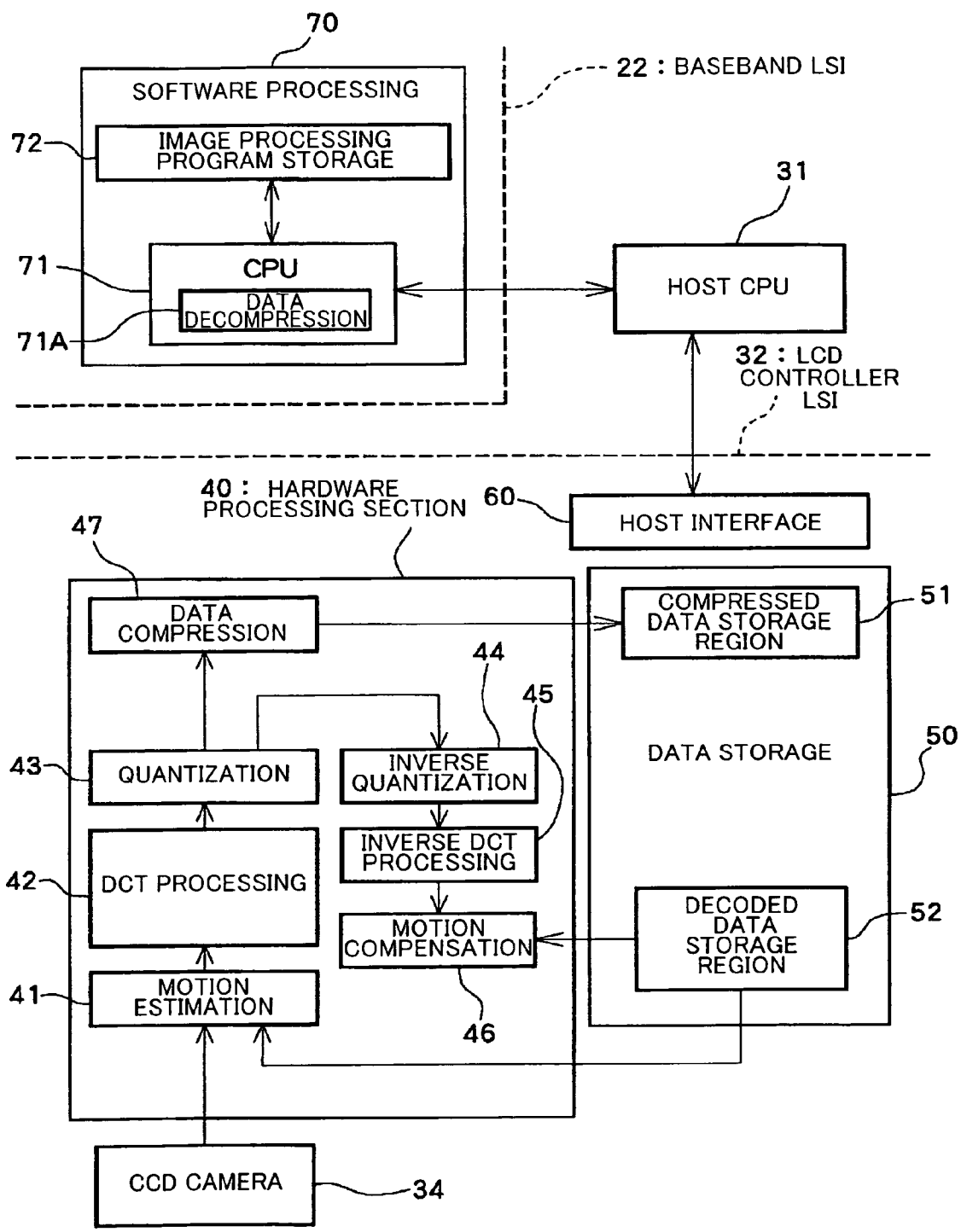
FIG. 7 is a block diagram for illustrating the configuration relating to an MPEG encoder in FIG. 1.

FIG. 7 is a functional block diagram of the LCD controller LSI 32 shown in FIG. 1. FIG. 7 shows hardware relating to a moving image compression (or encoding) section. The LCD controller LSI 32 includes a hardware processing section 40 which performs Steps 1 to 6 shown in FIG. 2A, and a data storage section 50. The LCD controller LSI 32 is connected with the host CPU 31 through a host interface 60. A software processing section 70 is provided in the baseband LSI 22. The software processing section 70 performs Steps 7 to 10 shown in FIG. 2A. The software processing section 70 is connected with the host CPU 31.

The hardware processing section 40 provided in the LCD controller LSI 32 includes processing sections 41 to 46 for performing the processing in Steps 1 to 6 shown in FIG. 2A. The hardware processing section 40 includes a data compression section 47 which compresses data processed by a quantization section 43. The compressed data is stored in a compressed data storage region 51 provided in the data storage section 50 (SRAM, for example) in the LCD controller 32. A decompressed (decoded) data storage region 52 is further provided in the data storage section 50. Decoded data processed by a motion compensation section 46 is stored in the storage region 52. The moving image data stored in the decoded data storage region 52 is input to a motion estimation section 41. The difference between the moving image data in the next frame from the CCD camera 34 and the moving image data in the preceding frame stored in the decoded data storage region 52 is calculated by the motion estimation section 41.

The software processing section 70 is described below. The software processing section 70 includes a CPU 71 and an image processing program storage section 72 as hardware. The CPU 71 performs Steps 7 to 10 shown in FIG. 2A for the moving image in the middle of compression which is processed by the hardware processing section 40 according to an image processing program stored in the storage section 72. The CPU 71 also functions as a data decompression section 71A which decompresses the moving image data from the data storage section 50. The data in the compressed data storage region in the data storage section 50 is input to the CPU 71 in the baseband LSI 22 through the host interface 60 and the host CPU 31, and decompressed by the data decompression section 71A. The processing in Steps 7 to 10 shown in FIG. 2A is then performed.

In the present embodiment, Steps 1 to 6 shown in FIG. 2A are processed by the hardware and Steps 7 to 10 are processed by the software for the following reasons. Since zero data accounts for the majority of each block as shown in FIG. 6 after the quantization in Step 3 shown in FIG. 2A, the amount of information on the type of data is significantly small in comparison with the data before the quantization (FIG. 4). Moreover, since the operation load in Steps 7 to 10 is small, the processing load is small even if Steps 7 to 10 shown in FIG. 2A are processed by the software. On the contrary, the quantization in Step 3, DCT in Step 2, and inverse DCT in Step 5 shown in FIG. 2A handle a large amount of information and perform complicated operations. Therefore, the processing load is heavy for the software processing. Although the quantization, DCT, inverse DCT, and motion compensation are heavy load processing, the necessity of changing the processing is limited since the processing is determined in advance. Moreover, most of the processing in Steps 1 to 6 shown in FIG. 2A is repetition processing. Therefore, the processing is suitably performed by hardware processing. Since the amount of data after the quantization processed by the hardware processing section 40 is small, the amount of data transmitted from the hardware processing section 40 to the software processing section 70 through the host CPU 31 is small. Therefore, the load imposed on the host CPU 31 is reduced.

Figure 8:
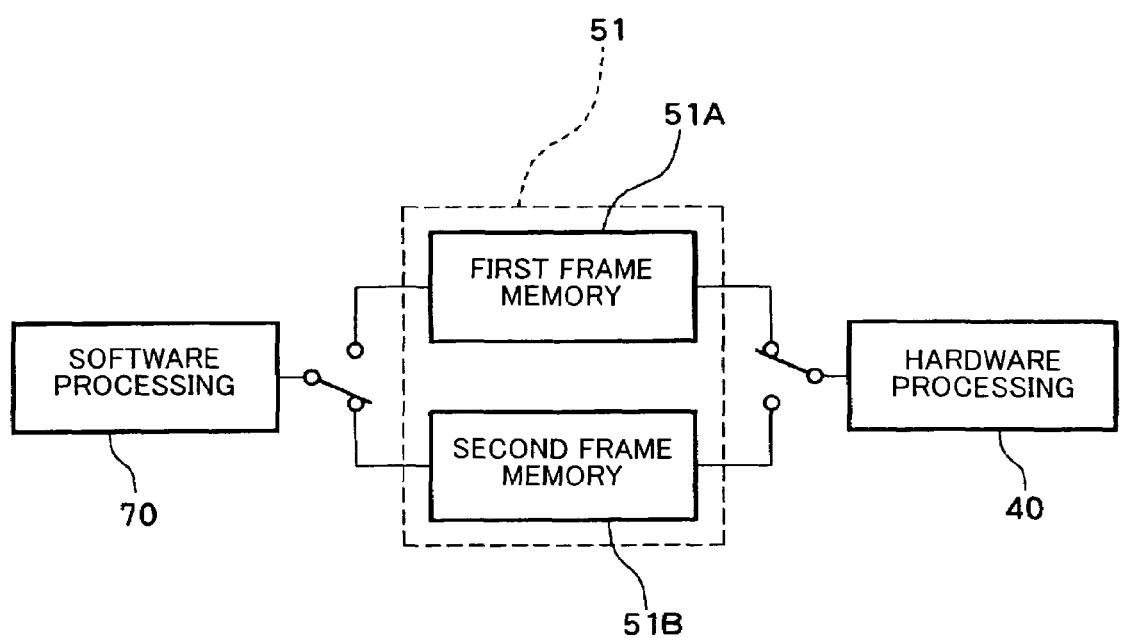
FIG. 8 is a diagram for illustrating an example of a buffer provided between a software processing section and a hardware processing section.

The compressed data storage region provided between the software processing section 70 and the hardware processing section 40 is described below. In the processing in the software processing section 70, the amount of information changes depending on the complexity of the moving image and intensity of motion, and the processing time changes depending on the amount of information. On the other hand, the processing time in the hardware processing section 40 changes only to a small extent. In order to efficiently drive the software processing section 70 and the hardware processing section 40 in parallel, the compressed data storage region which functions as a buffer is necessary between the software processing section 70 and the hardware processing section 40. In this time, at least a buffer for one frame is necessary. As shown in FIG. 8, first and second frame memories 51A and 51B may be provided, for example. This prevents the hardware processing section 40 from being restricted by the processing time in the software processing section 70.

In the present embodiment, data obtained by compressing the data processed by the software in Steps 1 to 3 shown in FIG. by the data compression section 47 shown in FIG. 7 is stored in the compressed data storage region. Therefore, the amount of information transmitted from the compressed data storage region 51 to the software processing section 70 through the host CPU 31 is further reduced, whereby the period of time in which the host CPU 31 is exclusively used for data transmission is reduced.

Data Compression and Data Decompression

Figure 9:
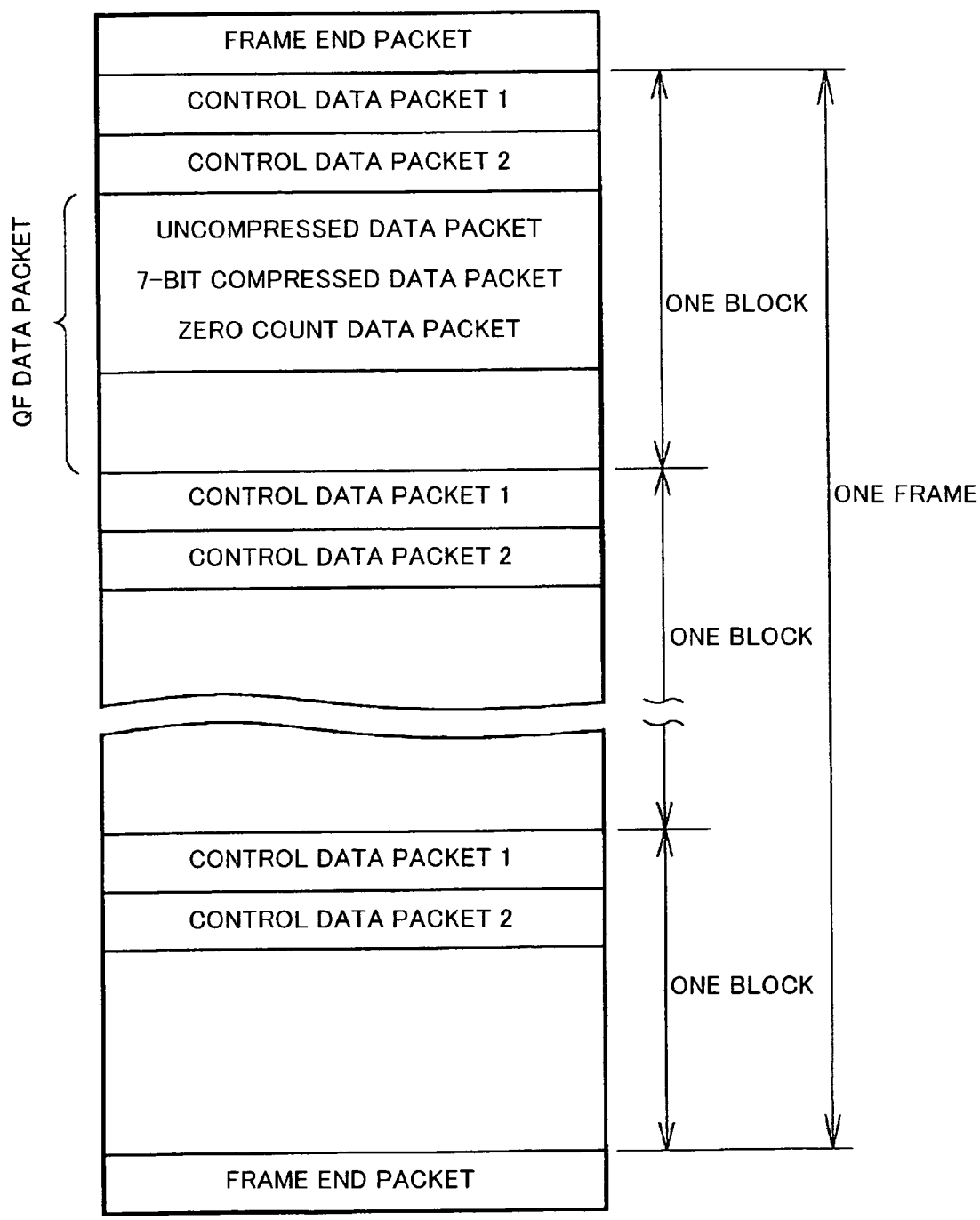
FIG. 9 is a diagram for illustrating information for one frame stored in the buffer.
Figure 10A:
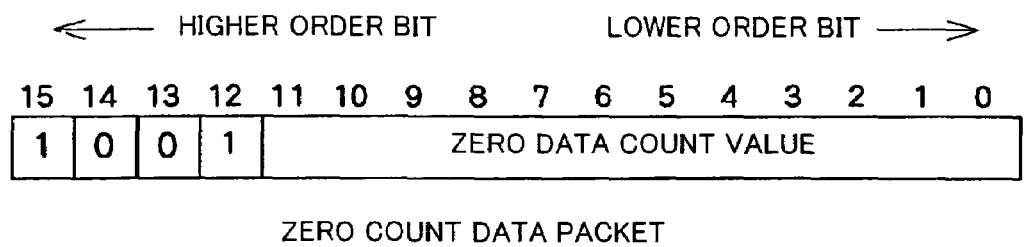
FIGS. 10A to 10C are diagrams for illustrating the types of QF data packets shown in FIG. 9.
Figure 10B:
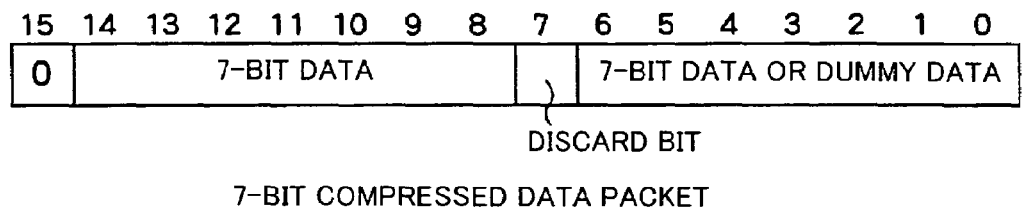
Figure 10C:
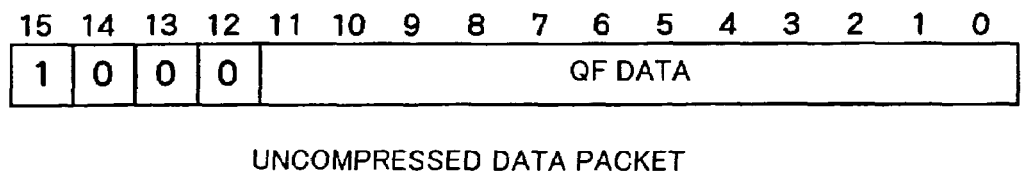

The data compression operation in the data compression section 47 shown in FIG. 7 is described below. FIG. 9 shows a storage region for one frame in the compressed data storage region shown in FIG. 7. The storage region for one frame is disposed between frame end packets in front and behind, and divided in units of blocks shown in FIG. Each block is made up of control data packets 1 and 2 and a number of QF data packets. The control data packets 1 and 2 store control data which is generated by the processing in Steps 1 to 3 shown in FIG. 2B and is necessary for the encoding by the hardware processing section 40.

The QF data processed in Steps 1 to 3 shown in FIG. 2A is compressed. The QF data is compressed and stored in a QF data packet shown in FIG. 9. The QF data packet includes a zero count packet, a 7-bit compressed data packet, and an uncompressed data packet shown in FIGS. 10A to 10C, for example.

The frame end packet, the control data packet, and the QF data packet shown in FIG. 9 have a 16-bit data length, for example. In the zero count packet shown in FIG. 10A, identification data "1001" which indicates the zero count packet is stored in higher-order four bit fields, and a zero data count value is stored in the remaining 12 bits. In the 7-bit compressed data packet shown in FIG. 10B, identification data "0" which indicates the 7-bit compressed data packet is stored in a higher-order one bit field, and 7-bit compressed data is stored in the subsequent seven bit fields. The subsequent bit field (eighth bit) is a discard bit sign field. If 7-bit data stored in the lower-order seven bits is effective compressed data, "0" is stored in the discard bit field. If 7-bit data stored in the lower-order seven bit fields is dummy data, "1" is stored in the discard bit field. If the QF data is seven bits or less, two items of QF data are compressed and stored in one 7-bit compressed data packet. In the uncompressed data packet shown in FIG. 10C, identification data "1000" which indicates the uncompressed data packet is stored in higher-order four bit fields, and uncompressed data is stored in the subsequent 12 bit fields. A bit which indicates a positive or negative sign is assigned to the most significant bit of each of the 7-bit compressed data and the 12-bit uncompressed data.

FIG. 11 shows a state in which the QF data is stored in each packet. FIG. 11 shows a state in which the QF data in one block shown in FIG. 3 indicated in three hexadecimal digits (positive or negative sign is omitted) is compressed in three types of packets shown in FIGS. 10A to 10C (only compression of data in the upper two lines in one block is illustrated). A to F in FIG. 11 respectively correspond to numerical values of 10 to 15. For example, the maximum value FFF in three hexadecimal digits means "$15 \times 16^2 + 15 \times 16^1 + 15 \times 16^0 = 4095$".

"025" in hexadecimal notation at the start address in one block corresponds to "37" in decimal notation. This value can be expressed by seven bits "0100101" in binary notation (most significant (sign) bit is set to "0"; hereinafter the same). Therefore, this data is stored in the lower-order seven bit fields of the 7-bit compressed data packet. "001" in hexadecimal notation at the next address corresponds to "1" in decimal notation. This value can be expressed by seven bits "0000001" in binary notation. Therefore, this data is stored in the higher-order seven bit fields of the 7-bit compressed data packet. Six zero-data items of "000" are continuously arranged after the next address. Therefore, "110" which indicates the number "6" of the zero-data items in binary notation is stored in the last three bits of the zero count data packet. "02F" and "003" in hexadecimal notation in the second line respectively correspond to "47" and "3" in decimal notation. Since these values can be expressed by seven bits or less in binary notation, these values are stored in the 7-bit compressed data packet as shown in FIG. 11. Since there is only one zero-data item "000" exists at the next address, the zero data count value is stored in the zero count data packet. "FFC" and "FFF" in hexadecimal notation at the subsequent addresses respectively correspond to "4092" and "4095" in decimal notation. These values cannot be expressed by data of seven bits or less in binary notation. Therefore, "FFC" and "FFF" are stored in the uncompressed data packets. Three zero-data items of "000" are continuously arranged after the next address. Therefore, "11" which indicates the number of the zero-data items "3" in binary notation is stored in the last two bits of the zero count data packet. The remaining QF data is compressed in the same manner as describe above.

Figure 12:
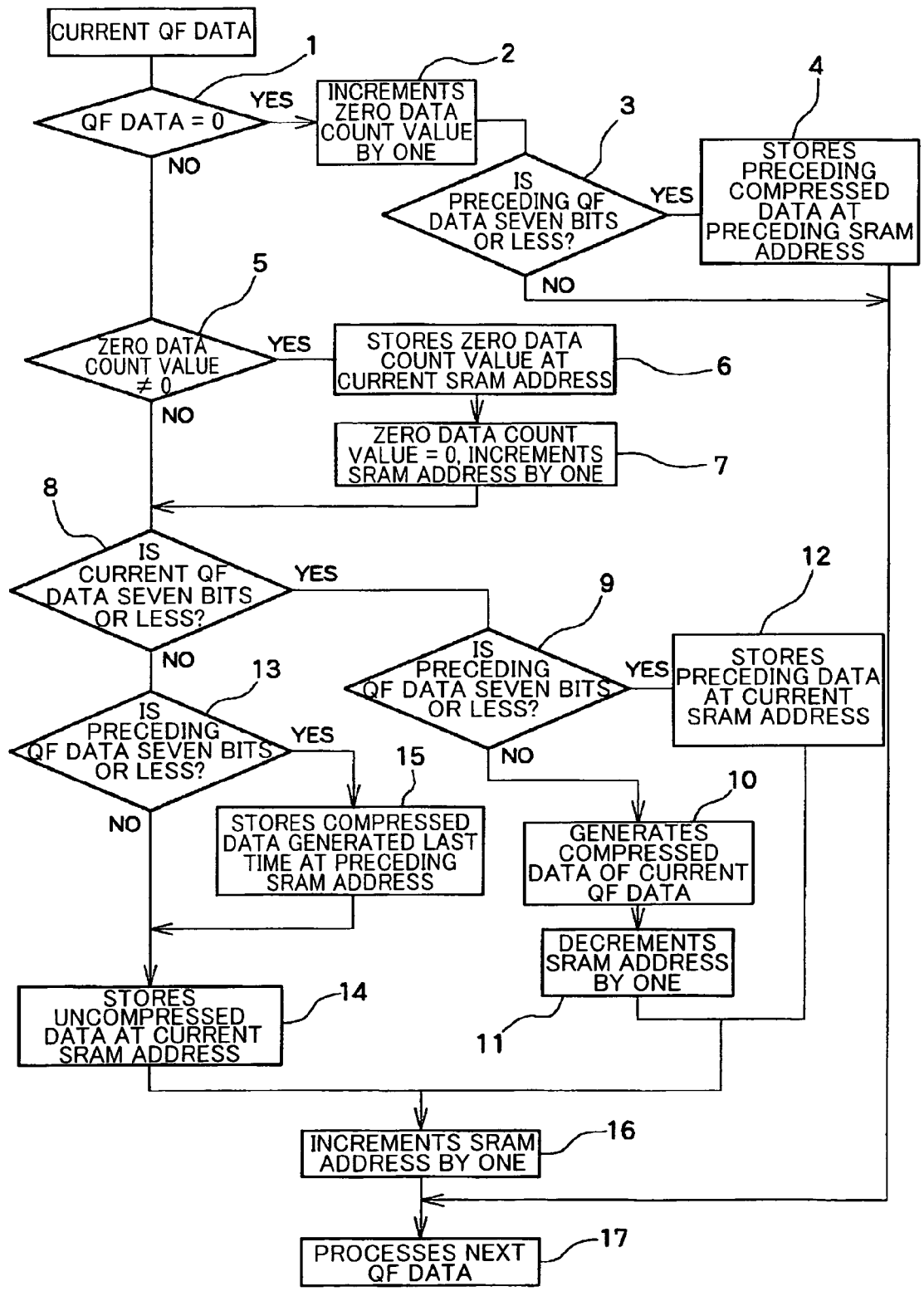
FIG. 12 is a flowchart showing data compression by a data compression section in a hardware processing section of FIG. 7.

FIG. 12 is a flowchart showing a compression processing procedure of the QF data. If the QF data is 0 ("YES" in Step 1), the zero data count value is incremented by one (Step 2). If the QF data is the first piece of data, the judgment in Step 3 is "NO" and the next QF data is processed (step 17). Specifically, if the QF data is 0, the zero data count value is repeatedly incremented until succession of zero data ends. Therefore, writing of data into the compressed data storage region 51 (SRAM) is suspended. If the QF data before the QF data which is 0 is seven bits or less ("YES" in Step 3), compressed data of seven bits or less generated the last time in Step 10 described later is stored in the storage region at the preceding SRAM address.

If the current QF data is not 0 ("NO" in Step 1), whether or not the zero data count value is 0 is judged (Step 5). If the zero data count value is not 0 ("YES" in Step 5), the preceding QF data is 0 and succession of zero data ends this time. Therefore, the zero data count data is stored at the current SRAM address (Step 6). The zero data count value is then reset to 0, and the address value is incremented by one (Step 7).

In Step 8, whether or not the current QF data can be expressed by seven bits or less is judged. If "YES" in Step 8, whether or not the preceding QF data can be expressed by seven bits or less is judged (Step 9). If "NO" in Step 9, compressed data (7-bit data) of the current QF data is generated in Step 10. Since the SRAM address is decremented by one in Step 11, the preceding address is maintained even if the address is incremented by one in Step 16. The next QF data is then processed (Step 17). Writing of compressed data generated this time is suspended. As described above, although the compressed data of seven bits or less is generated in Step 10, the compressed data is not stored before Step 4 or Step 12 or 15 described later.

If "YES" in Step 9, compressed data generated in Step 10 in the preceding processing is stored in the storage region at the current SRAM address. The SRAM address is then incremented in Step 16, and the next QF data is processed (Step 17).

If "NO" in Step 8, whether or not the preceding QF data is seven bits or less is judged (Step 13). If "NO" in Step 13, the QF data is stored in the storage region at the current SRAM address as uncompressed data (Step 14). If "YES" in Step 13, compressed data generated in Step 10 the last time is stored at the preceding SRAM address (Step 15). This enables the zero data count value, the 7-bit compressed data, or the uncompressed data shown in FIG. 11 to be stored.

Figure 13:
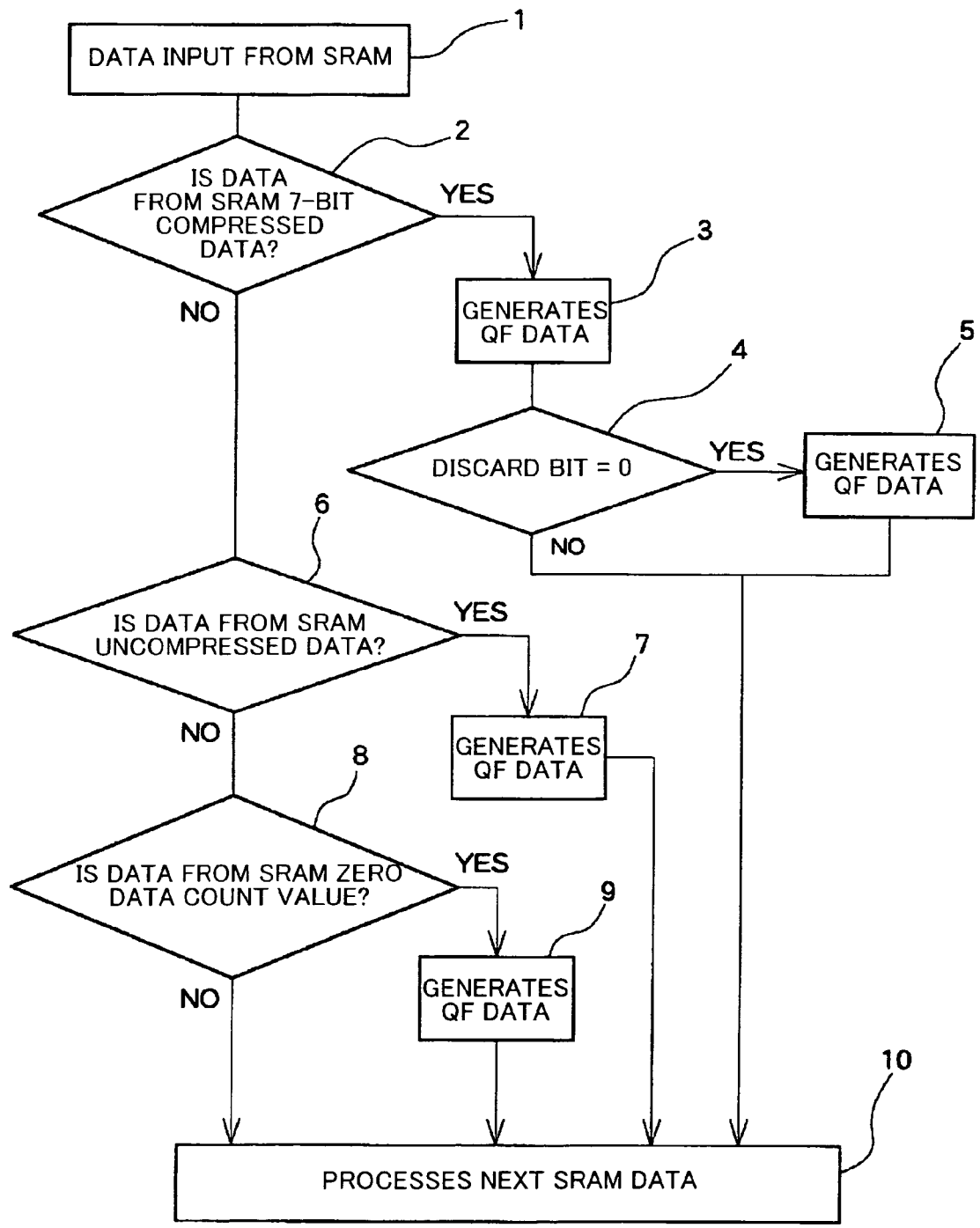
FIG. 13 is a flowchart showing data decompression by a data decompression section in a software processing section of FIG. 7.

FIG. 13 shows a data decompression operation of the data decompression section 71 A provided in the software processing section 70 shown in FIG. 7.

Data is captured from the compressed data storage region of the data storage section 50 (SRAM) shown in FIG. 7 (Step 1), and whether or not the data from the SRAM is 7-bit compressed data is judged (Step 2). If "YES" in Step 2, QF data is generated based on the 7-bit compressed data (Step 3). If the discard bit in the packet is 0 ("YES" in Step 4), another piece of effective data exists in the same packet. In this case, QF data is generated based on this effective data (Step 5). If "NO" in Step 4 or the processing in Step 5 has been completed, the next SRAM data is processed (Step 10).

If "NO" in Step 2, whether or not the data from the SRAM is uncompressed data is judged (Step 6). If "YES" in Step 6, QF data is generated based on the uncompressed data (Step 7).

If "NO" in Step 6, whether or not the data from the SRAM is zero data count value is determined (Step 8). of the number corresponding to the zero data count value is generated (Step 9). If "NO" in Step 8 or the processing in Step 9 has been completed, the next SRAM data is processed (Step 10).

The processing in Steps 7 to 10 shown in FIG. 2A is performed by the software processing section 70 based on the QF data generated by the data decompression section 71A shown in FIG. 7 and the control data from the SRAM 50, whereby the moving image is compressed by the MPEG-4 method.

In the present embodiment, description of the MPEG decoder which decompresses the compressed moving image from the antenna 21 shown in FIG. 1 is omitted. In the MPEG decoder, the same effects as those in the above-described embodiment can be obtained by dividing the series of processing into hardware processing and software processing as shown in FIG. 2B, and providing the compressed data storage section between the hardware processing section and the software processing section as a buffer.

The present invention is not limited to the above-described embodiment. Various modifications and variations are possible within the spirit and scope of the present invention. The electronic instrument to which the present invention is applied is not limited to the portable telephone. The present invention may be suitably applied to other electronic instruments such as portable instruments. The compression method of the moving image is not limited to the MPEG-4 method. The compression method may be another compression method including processing such as variable length coding and quantization.

What is claimed is:

1. A moving image compression device, comprising:
   a hardware processing section which compresses moving image data by hardware;
   a data storage section which stores the moving image data processed by the hardware processing section; and
   a software processing section which compresses the moving image data from the data storage section by software,
   wherein the hardware processing section includes a plurality of processing sections which perform processing including a discrete cosine transform and subsequent quantization of the moving image data; and
   wherein the software processing section performs variable-length coding of the moving image data quantized by the hardware processing section,
   the hardware processing section includes a data compression section which compresses the moving image data to be stored in the data storage section,
   the data storage section includes a plurality of types of packets each of which has a predetermined number of bits, the packets being identified by a higher-order bit, and
   the data compression section selectively uses the packets depending on whether the packets store compressed data or uncompressed data.

2. The moving image compression device as defined in claim 1, wherein the software processing section includes a data decompression section which decompresses the moving image data from the data storage section.

3. The moving image compression device as defined in claim 2,
wherein the data compression section counts the number of zero data items continuously arranged on at least one pixel line and compresses the zero data items into a zero data count value.

4. The moving image compression device as defined in claim 1, wherein:
one of the packets is a zero count data packet; and
the data compression section stores the zero data count value in the zero count data packet.

5. The moving image compression device as defined in claim 4, wherein:
another one of the packets is a compressed data packet; and
the data compression section stores a plurality of items of the moving image data in the same compression data packet, each of the items of the moving image data being represented by one or more bits, and a number of bits of the moving image data being equal to or less than a predetermined number.

6. The moving image compression device as defined in claim 5, wherein:
still another one of the packets is an uncompressed data packet; and
the data compression section stores the moving image data in the uncompressed data packet, the moving image data being represented by one or more bits, and a number of bits of the moving data being larger than a predetermined number.

7. The moving image compression device as defined in claim 1, wherein:
the data storage section includes a first storage region which stores the moving image data for at least one frame.

8. The moving image compression device as defined in claim 7, wherein:
the hardware processing section includes a processing section which performs the discrete cosine transform of the moving image data in units of blocks, each block including 8×8 pixels; and
the first storage region includes a second storage region for one block of the moving image data, the second storage region having all the types of the packets.

9. The moving image compression device as defined in claim 8,
wherein a control data packet which stores control data generated by the hardware processing section is provided in the second storage region.

10. The moving image compression device as defined in claim 1, wherein:
the hardware processing section includes a decompression processing section which performs inverse transform and decompresses quantized data; and
the data storage section includes a decompressed data storage region which stores the moving image data for at least one frame decompressed by the hardware processing section.

11. The moving image compression device as defined in claim 1,
wherein the software processing section performs scan processing before the variable-length coding.

12. The moving image compression device as defined in claim 11,
wherein the software processing section performs alternating current/direct current (AC/DC) component prediction before the scan processing.

13. An imaging device, comprising:
an imaging section;
a first integrated circuit which compresses moving image data from the imaging section by hardware;
a host CPU connected to the first integrated circuit; and
a second integrated circuit connected to the host CPU and including a software processing section,
wherein the first integrated circuit includes a hardware processing section which compresses the moving image data from the imaging section by hardware, and a data storage section which stores the moving image data processed by the hardware processing section;
the hardware processing section includes a plurality of processing sections which perform processing including a discrete cosine transform and subsequent quantization of the moving image data;
the software processing section performs variable-length coding of the moving image data quantized by the hardware processing section, wherein:
the hardware processing section includes a data compression section which compresses the moving image data to be stored in the data storage section,
the data storage section includes a plurality of types of packets each of which has a predetermined number of bits, the packets being identified by a higher-order bit, and
the data compression section selectively uses the packets depending on whether the packets store compressed data or uncompressed data.

* * * * *